United States Patent
Liao et al.

(10) Patent No.: US 9,719,825 B2
(45) Date of Patent: *Aug. 1, 2017

(54) MULTIPHASE FLOW MEASUREMENT

(71) Applicant: DELAVAL HOLDING AB, Tumba (SE)

(72) Inventors: Bohao Liao, Sollentuna (SE); Torbjorn Petterson, Gnesta (SE)

(73) Assignee: DELAVAL HOLDING AB, Tumba (SE)

( * ) Notice: Subject to any disclaimer, the term of this patent is extended or adjusted under 35 U.S.C. 154(b) by 626 days.

This patent is subject to a terminal disclaimer.

(21) Appl. No.: 14/353,547

(22) PCT Filed: Oct. 25, 2012

(86) PCT No.: PCT/SE2012/051148
§ 371 (c)(1),
(2) Date: Apr. 23, 2014

(87) PCT Pub. No.: WO2013/062473
PCT Pub. Date: May 2, 2013

(65) Prior Publication Data
US 2014/0260660 A1    Sep. 18, 2014

Related U.S. Application Data

(60) Provisional application No. 61/552,523, filed on Oct. 28, 2011.

(30) Foreign Application Priority Data

Oct. 28, 2011   (SE) .................................... 11510104

(51) Int. Cl.
*G01F 1/00* (2006.01)
*G01F 7/00* (2006.01)
(Continued)

(52) U.S. Cl.
CPC   *G01F 1/74* (2013.01); *A01J 5/01* (2013.01); *G01F 1/708* (2013.01)

(58) Field of Classification Search
CPC ......... G09G 2310/08; G09G 2320/066; G09G 2330/021; G09G 3/3648;
(Continued)

(56) References Cited

U.S. PATENT DOCUMENTS

| 4,751,842 A | 6/1988 | Ekrann et al. |
|---|---|---|
| 5,116,119 A | 5/1992 | Brayer |

(Continued)

FOREIGN PATENT DOCUMENTS

| EP | 1 155 610 A2 | 11/2001 |
|---|---|---|
| FR | 2 722 292 A1 | 1/1996 |

(Continued)

OTHER PUBLICATIONS

International-Type Search Report, dated Apr. 27, 2012, from corresponding PCT application.

(Continued)

*Primary Examiner* — Roy Y Yi
(74) *Attorney, Agent, or Firm* — Young & Thompson

(57)   ABSTRACT

A flow measuring device includes a first sensor device that responds to one stimulus caused by a fluid medium flowing through a measurement section by registering a first measure representing a first type of physical characteristic of the fluid medium, and a second sensor device that responds to another stimulus caused by the fluid medium by registering a second measure representing a second type of physical characteristic of the fluid medium, the second measure being independent from the first measure, and the first and second measures both being dependent on the flow of the first fluid and on the flow of the second fluid in the fluid medium in the measurement section, the first measure and the second measure being sufficient to solve both a first function that (Continued)

defines the flow of the first fluid and a second function that defines the flow of the second fluid.

21 Claims, 2 Drawing Sheets

(51) Int. Cl.
    *G01F 1/74* (2006.01)
    *A01J 5/01* (2006.01)
    *G01F 1/708* (2006.01)

(58) Field of Classification Search
    CPC ... G09G 2320/0238; G09G 2320/0646; G09G 3/2018; G09G 3/3406; G09G 2300/0452; G09G 2320/0285; G09G 2320/0626; G09G 3/2003; A61B 5/01; A61B 2018/00577; A61B 2018/00023; A61B 2018/00642; A61B 2018/00702; A61B 2018/00815; A61B 2217/007; A61B 2218/002; A61B 5/6852; A61B 18/1206; A61B 18/1492; A61B 2018/00029
    See application file for complete search history.

(56) References Cited

U.S. PATENT DOCUMENTS

| | | | |
|---|---|---|---|
| 6,655,221 B1 | 12/2003 | Aspelund et al. | |
| 7,133,786 B1 | 11/2006 | Dykesteen et al. | |
| 7,155,971 B2 | 1/2007 | Wamhof et al. | |
| 2005/0034518 A1 | 2/2005 | Wamhof et al. | |
| 2008/0236298 A1 | 10/2008 | Gysling | |
| 2009/0241672 A1 | 10/2009 | Gysling | |
| 2010/0321030 A1* | 12/2010 | Gale | F04B 51/00 324/537 |

FOREIGN PATENT DOCUMENTS

| | | |
|---|---|---|
| RU | 2 164 340 C2 | 3/2001 |
| RU | 2 320 964 C2 | 3/2008 |
| RU | 2 382 989 C2 | 2/2010 |
| WO | 01/29518 A1 | 4/2001 |
| WO | 20061121480 A2 | 11/2006 |
| WO | 20091030870 A1 | 3/2009 |
| WO | 20091125412 A2 | 10/2009 |
| WO | 20101068118 A1 | 6/2010 |

OTHER PUBLICATIONS

International Search Report, dated Mar. 13, 2013, from corresponding PCT application.

Supplementary International Search Report, dated Jan. 30, 2014, from corresponding PCT application.

R. Thorn et al., "Recent developments in three-phase flow measurement", Measurement Science and Technology, 1997, p. 691-701, vol. 8.

* cited by examiner

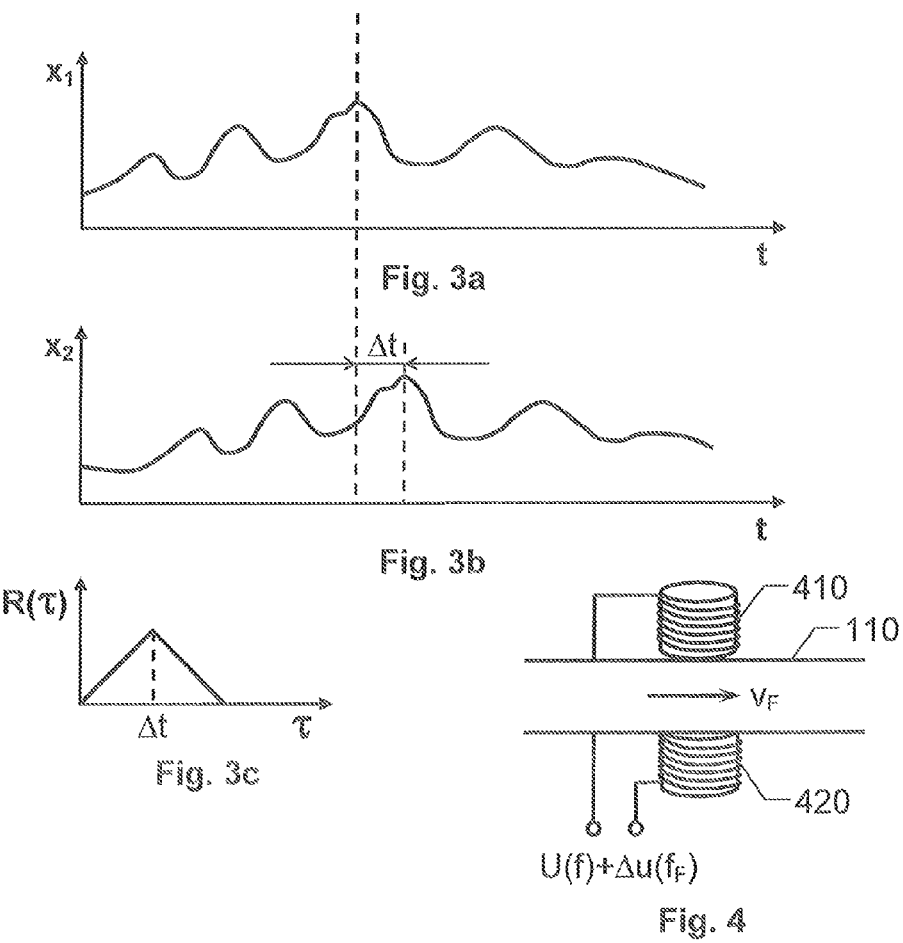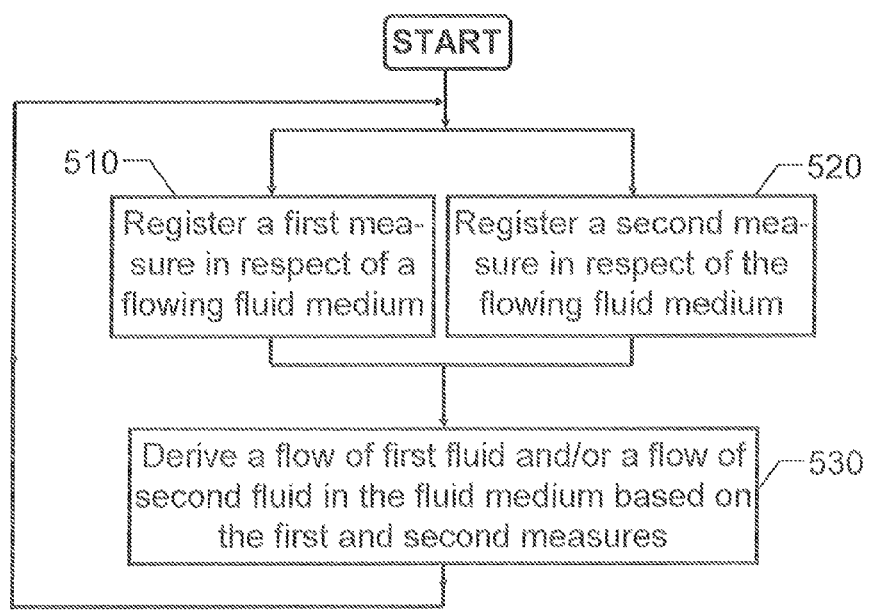

MULTIPHASE FLOW MEASUREMENT

THE BACKGROUND OF THE INVENTION AND PRIOR ART

The present invention relates generally to measuring fluid flows. More particularly the invention relates to a device according to the preamble of claim 1 and a method according to the preamble of claim 11. The invention also relates to a computer program according to claim 19 and a computer readable medium according to claim 20.

Measuring a liquid flow is a relatively straightforward task provided that the flowing medium is homogenous, i.e. if there is only a single substance present in the conduit where the flow is to be measured. However, in practice, it is often the case that the flowing medium is non-homogenous, i.e. there is more than one substance present in the conduit. Moreover, the proportions between the different constituents in the flow may vary over time. As a result, it can be rather complicated to determine relevant flow measures. To mention a few examples, such liquid flows are common in milk extraction and transport, and in the oil and gas industry.

The prior art contains various examples of flow measurement solutions. For example WO 01/29518 discloses a solution for carrying out measurements of a pulsating milk flow in a line. Thus, here, the measured medium comprises a gas and a liquid. The line has a measuring region in which at least one parameter of the medium is determined during a measurement. The measuring region, in turn, may contain a measuring chamber in which milk remains after a pulse flow. This allows further analysis of the milk, such as color analysis.

U.S. Pat. No. 5,116,119 reveals a solution for measuring milk flows, wherein the liquid is directed to flow through one or more flow channels, while exposing the liquid to electromagnetic radiation. The liquid's transparency to electromagnetic radiation is used to determine a momentary volume of the liquid flowing through each flow channel. The momentary velocity of the liquid flowing through the flow channels is also determined, thereby permitting a determination of the momentary flow rate of the liquid flowing through the flow channels.

EP 1 155 610 describes a quantity meter for determining the quantity of liquid flowing through a line. The quantity meter has two electrically conductive elements arranged in the line at a fixed measuring distance from each other. The conductive elements are connected to an electronic circuit. The diameter of the line is such that when the liquid is flowing there through the volume of the line across the measuring distance is completely filled for some time. Furthermore, in the electronic circuit the quantity of liquid flowing through is determined based on the measured electric conductivity of the liquid therein.

U.S. Pat. No. 7,155,971 shows a device for determining the volumetric flow rate of milk flowing during a milking process. Here, a cross-sectional area of the milk flow is determined at a first measuring point by means of a sensor, which is arranged outside the flowing milk. The time required by the milk flow, with the determined cross-sectional area, to go from the first measuring point to a second measuring point provided downstream from the first measuring point is measured. The flow speed is then derived from the measured time and the known distance between the first and second measuring points. The volumetric flow rate is determined on the basis of the determined cross-sectional area and the flow speed.

Problems Associated with the Prior Art

Hence, solutions are known in the prior art for determining a liquid flow in a fluid flow that contains both gas and liquid. Given that the overall liquid flow also is measured it is likewise possible to derive the gas flow based on the prior-art solutions. However, there is yet no fully reliable and efficient solution, which allows online measurement of a gas flow and/or a liquid flow in a fluid flow containing both gas and liquid.

SUMMARY OF THE INVENTION

The object of the present invention is to mitigate the above problem, and thus offer an improved means for determining a flow of a first fluid (e.g. a gas) or a flow of a second fluid (e.g. a liquid), or both, in a fluid flow where the first and second fluids are mixed.

According to one aspect of the invention, the object is achieved by the initially described device, wherein the first measure represents a first type of physical characteristic of the fluid medium flowing through the measurement section, and the second measure represents a second type of physical characteristic of the fluid medium flowing through the measurement section. The second type of physical characteristic is here different from the first type of physical characteristic. For example this means that the first measure may represent a speed of the flowing medium, while the second measure represents a filling degree of the measurement section (or a ratio between the amounts of first and second fluids therein). However, alternative physical characteristics are also conceivable, such as representations of distinctive flow patterns in the fluid medium.

In any case, this device is advantageous because it provides straightforward information concerning the flow components of the constituents in a mixed fluid flow, such as the air and/or milk respectively in a milk conduit of a milking installation.

According to a preferred embodiment of this aspect of the invention, each of the first and second sensor devices comprises at least one inductive sensor, conductive sensor, differential-pressure sensor, optical sensors and/or acoustic sensor. It should be noted that although the first and second measures represent different types of physical characteristics, the first and second sensor devices may include the same types of sensor devices. The above-mentioned sensor devices are all beneficial because they are unobtrusive, i.e. do not influence the measurements as such.

According to yet another preferred embodiment of this aspect of the invention, the device includes a data storage including a look-up table. The look-up table, in turn, contains representative values of the flow of the first fluid and/or the flow of the second fluid for each of a set of pairs of the first and second measures. The processor is configured to derive the first and second measures based on the look-up table, for example by interpolating between, or extrapolating from the data therein. Hence, the design becomes very processing efficient.

According to still another preferred embodiment of this aspect of the invention, the processor is instead configured to implement an artificial neural network modeling a relationship between a set of pairs of the first and second measures and the flow of the first fluid and/or the flow of the second fluid respectively. Thereby, a highly memory-efficient design is attainable.

According to further preferred embodiments of this aspect of the invention, the first sensor device is configured to register the first measure as a speed of the fluid medium and the second sensor device is configured to measure an electrical conductivity of the fluid in the measurement section. Based thereon, a measure is derived representing an estimated ratio between an amount of the first fluid and an amount of the second in the measurement section. Thus, relatively low flow rates can be determined especially accurately.

According to yet another preferred embodiment of this aspect of the invention, the measurement section contains a designated space configured to temporarily store an amount of the fluid medium. An electrical conductivity reference measurement is executed with respect to the amount fluid medium stored in this space. Thus, reliable conductivity measurements can be performed on the fly.

According to still another preferred embodiment of this aspect of the invention, the second sensor device is configured to register the second measure as a pressure drop over a well-defined conduit segment of the measurement section. Such an arrangement is especially suitable for registering relatively high flow rates.

According to another preferred embodiment of this aspect of the invention, the second sensor device is configured to analyze the fluid medium in the measurement section during a measurement interval. Based thereon, the second measure is produced to represent a flow pattern of the fluid medium during said measurement interval. The flow pattern may be a statistical representation of how the first and second fluids are distributed in the measurement section over time. Namely, for instance, a given ratio between gas and liquid may correspond to many different distributions of gas bubbles in the liquid ranging from one large bubble to a high number of very small bubbles. These differences can be captured in the form of various flow pattern classifications, which, in turn (given a particular flow rate), correspond to different liquid flows and gas flows.

According to a further preferred embodiment of this aspect of the invention, the device includes a third sensor device which is also arranged in the measurement section. The third sensor device is configured to derive a third measure representing an estimated ratio between an amount of the first fluid and an amount of the second fluid in the measurement section based on a measured electrical conductivity of the fluid in the measurement section. The second sensor device is configured to register the second measure as a pressure drop over a well-defined conduit segment of the measurement section. The processor is configured to derive the flow of the first fluid and the flow of the second fluid based on the first, second and third measures by using the second measure for fluid flow rates above or equal to a threshold flow rate and using the third measure for fluid flow rates below the threshold flow rate. Hence, accurate first and second flow values can be determined over a very wide range of flow rates.

According to another aspect of the invention, the object is achieved by the method described initially, wherein the first measure is registered to represent a first type of physical characteristic of the fluid medium flowing through the measurement section, and the second measure is registered to represent a second type of physical characteristic of the fluid medium flowing through the measurement section, the second type of physical characteristic being different from the first type of physical characteristic. The advantages of this method, as well as the preferred embodiments thereof, are apparent from the discussion above with reference to the proposed device.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIGS. 3a-c illustrate how an overall flow rate may be determined according to one embodiment of the invention;

FIG. 4 illustrates how a proposed inductive sensor measures the speed of a flowing fluid medium; and FIG. 5 illustrates, by means of a flow diagram, the general method according to the invention.

DESCRIPTION OF PREFERRED
EMBODIMENTS OF THE INVENTION

Figure 1:
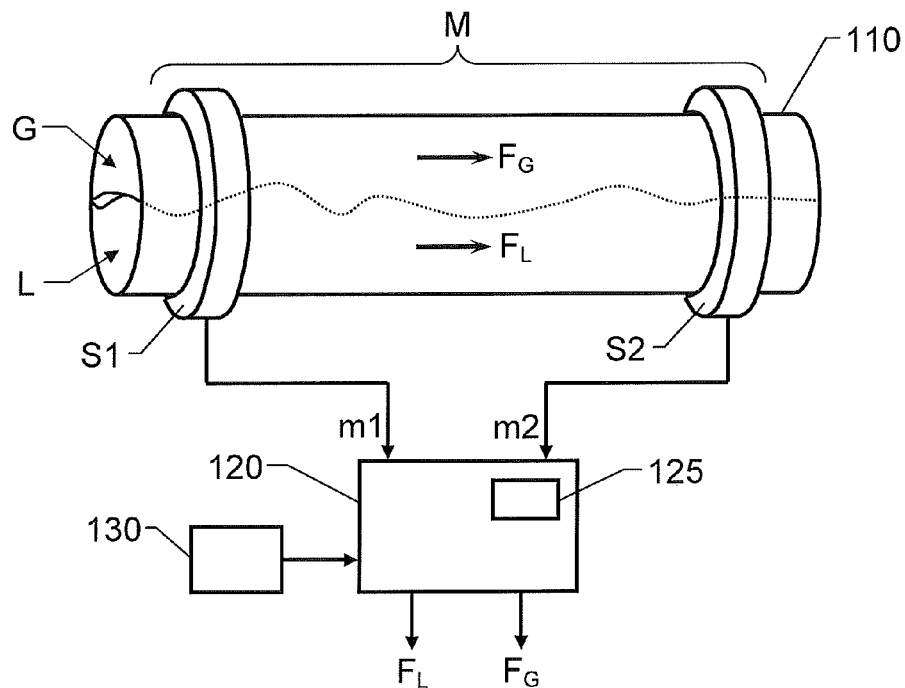
FIG. 1 shows a measurement section of a device according to a first embodiment of the invention.

Initially, we refer to FIG. 1, which shows a device according to a first embodiment of the invention. For simplicity, we will here assume that the first fluid represents a liquid L and that the second fluid represents a gas G, and consequently a liquid flow $F_L$ or a gas flow $F_G$ is to be determined in a fluid medium containing a mix of gas G and liquid L. The gas G, in turn, may contain air and the liquid L, in turn, may contain milk. Nevertheless, according to the invention, any alternative gas and liquid media are conceivable. Moreover, it should be noted that the invention is applicable to situations wherein the fluid medium contains a mix of different liquid media, e.g. water and oil, as well as other combinations of liquid and gas, such as oil/gas, water/steam, and oil/gas/water.

The proposed device includes a conduit 110, a first sensor device S1, a second sensor device S2 and a processor 120.

The conduit 110, for example a milk line, is configured to receive and transport the fluid medium through a measurement section M.

The first sensor device S1 (here schematically illustrated as a ring around the conduit 110) is arranged in the measurement section M, and configured to register a first measure m1 in respect of the fluid medium. The first measure m1 represents a first physical characteristic of the fluid medium in the measurement section M, such as the speed of the fluid medium. Alternatively, the first measure m1 may represent a ratio between the amount of gas G and the amount of liquid L present in the measurement section M (where the first sensor device S1 is located), i.e. a filling degree. As will be elaborated below, the first measure m1 may otherwise represent a flow pattern of the liquid medium.

In any case, the first sensor device S1 is configured to register the first measure m1 in response to energy fluctuations induced by the fluid medium flowing through the measurement section M. In other words, the first sensor device S1 is designed to respond to at least one stimulus caused by the fluid medium. To this aim, the first sensor device S1 may include one or more of the following: inductive sensors, conductive sensors, optical sensors and acoustic sensors.

The second sensor device S2 is likewise configured to respond to at least one stimulus caused by the fluid medium, and may thus include at least one inductive sensor, at least one conductive sensor, at least one optical sensor and/or at least one acoustic sensor. However, a second measure m2 registered by the second sensor device S2 represents a second type of physical characteristic, which is different from the first type of physical characteristic. This means that if for example the first measure m1 represents the speed of the fluid medium, the second measure m2 is a non-speed measure, such as the ratio between the amounts of gas G and liquid L in the measurement section M. Depending on what the first measure m1 represents, the second measure m2 may represent the speed of the fluid medium, a ratio between the amount of gas G and the amount of liquid L present in the measurement section M (where the second sensor device S2 is located), a pressure drop over a well-defined conduit segment of the measurement section M, or a flow pattern provided that the first and second measures m1 and m2 are different from one another.

Since the second measure m2 reflects a physical characteristic of a type different from that of the first measure m1, the second measure m2 is independent from the first measure m1.

Each sensor device S1 and S2 may contain two or more sensor elements. For instance, a conductive sensor configured to register a measure m1/m2 in the form of a volumetric flow rate requires at least two separate sensor elements to determine a travel time across a known distance. In order to calibrate the conductive sensor elements it is preferable if the measurement section M includes a designated space (e.g. a cavity, groove or other suitable volume) configured to temporarily store an amount of the fluid medium. Repeated electrical conductivity reference measurements can then be executed with respect to the amount of fluid medium in the designated space.

According to embodiments of the invention, the measure m1 or m2 may also represent a pressure drop over a well-defined conduit segment of the measurement section M. In such a case, the sensor device in question S1/S2 contains a differential-pressure sensor.

According to other embodiments of the invention, one of the sensor devices S1 or S2 is configured to analyze the fluid medium in the measurement section M during a measurement interval, say 0.5 to 45 seconds. Based on this analysis, the sensor device is configured to produce a measure m1 or m2 respectively to represent a flow pattern of the fluid medium during the measurement interval. The flow pattern describes how the gas and liquid are distributed in the measurement section over time. Namely, the filling degree alone may not provide a sufficiently accurate measure of the liquid-gas distribution in the fluid conduit 110, since a given ratio between gas and liquid may correspond to anything from a liquid amount joined by a single gas bubble to the same liquid amount being fully foamed by microscopic bubbles. To determine the gas flow and/or liquid flow accurately, it is vital that such differences in the gas-liquid distribution are identified. Preferably, different distinctive flow patterns are determined based on averaging and statistical analysis of, for instance the spectral properties of the fluid flow.

As is apparent from the embodiment illustrated in FIG. 1, the first sensor device S1 is arranged upstream of the second sensor device S2 in the measurement section M relative to a flow direction of the fluid medium. This is merely equivalent to the fact that the sensor devices S1 and S2 are physically separated from one another along the flow direction of the fluid medium. According to other embodiments of the invention (not shown), the sensor devices S1 and S2 may equally well be co-located in the measurement section M. The specific design chosen depends on which type(s) of sensor elements that are included in the sensor devices S1 and S2.

The processor 120 is configured to derive the liquid flow $F_L$ and/or the gas flow $F_G$ based on the first and second measures m1 and m2 respectively. This is possible because the first and second measures m1 and m2 are mutually independent and both dependent on the two flow components $F_G$ and $F_L$.

Mathematically, this can be expressed as:

$$\begin{pmatrix} m1 \\ m2 \end{pmatrix} = \begin{pmatrix} f1(F_G, F_L) \\ f2(F_G, F_L) \end{pmatrix} \qquad (1)$$

where $f1(F_G,F_L)$ is a first function of the gas flow $F_G$ and the liquid flow $F_L$ and $f2(F_G,F_L)$ is a second function of the gas flow $F_G$ and the liquid flow $F_L$.

Of course, since m1 and m2 are mutually independent, the relationship (1) is invertible to obtain the expression:

$$\begin{pmatrix} F_G \\ F_L \end{pmatrix} = \begin{pmatrix} F1(m1, m2) \\ F2(m1, m2) \end{pmatrix} \qquad (2)$$

where F1(m1, m2) is a first function of the measures m1 and m2 and F2(m1, m2) is a second function of the measures m1 and m2.

It is worth noticing that, according to the present invention, it is possible to generalize the expressions (1) and (2), such that n individual flows may be determined in a fluid flow containing n different fluids provided that n mutually independent measures are registered in respect of the fluid flow.

In practice it may be very difficult to derive the expression (2) analytically. Therefore, according to a first embodiment of the invention, the proposed device includes a data storage 130 including a look-up table containing representative values of the gas flow $F_G$ and/or the liquid flow $F_L$ for each of a set of pairs of the first and second measures m1 and m2. The look-up table, in turn, is preferably based on a relatively large number of reference measurements of m1 and m2, where each measurement is correlated with an independent registering of the gas flow $F_G$ and the liquid flow $F_L$ (i.e. a specific measuring of each separate flow).

If high accuracy is desired over a comparatively wide range of flow rates the look-up table may represent a substantial amount of data. Therefore, in some implementations, it may be interesting to trade storage space against processing resources, and thus replace the look-up table with an artificial neural network ANN modeling the relationship between pairs of the first and second measures m1 and m2 and/or the gas flow $F_G$ and the liquid flow $F_L$ respectively.

Figure 2:
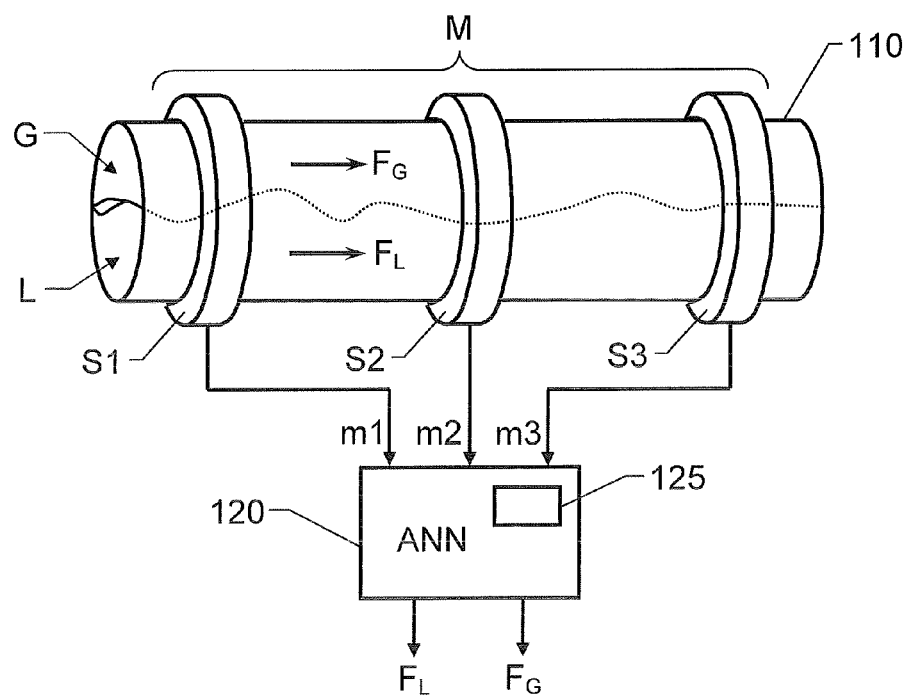
FIG. 2 shows a measurement section of a device according to a second embodiment of the invention.

FIG. 2 shows such an embodiment of the invention. Here, all the reference labels that also occur in FIG. 1 designate the same entities and parameters as those described above with reference to FIG. 1.

Nevertheless, the measurement section M illustrated in FIG. 2 also includes a third sensor device S3. This sensor device S3 is configured to derive a third measure m3 representing an estimated ratio between an amount of gas G and an amount of liquid L in the measurement section M based on a measured electrical conductivity of the fluid in the measurement section M.

The second sensor device S2 is here configured to register the second measure m2 as a pressure drop over a well-defined conduit segment of the measurement section M, and the first sensor device S1 is configured to register the first measure m1 as a speed of the fluid medium.

The processor 120 is configured to derive the gas flow $F_G$ and the liquid flow $F_L$ based on the first, second and third measures m1 m2 and m3 respectively by using the first measure m1 and the second measure m2 for fluid flow F rates above or equal to a threshold flow rate; and using the first measure m1 and the third measure m3 for fluid flow F rates below the threshold flow rate. Namely, a pressure sensor is relatively accurate for determining comparatively high flow rates, whereas a measure expressing the relative proportions of gas and liquid is capable of registering comparatively low flow rates.

Preferably, the processor 120 includes, or is associated with, a computer readable medium 125, e.g. in the form of a memory module, such that the processor 120 has access to the contents of this medium 125. Furthermore, a program is recorded in the computer readable medium 125, and the program is adapted to make the processor 120 control the process described above, as well as the embodiments thereof further elaborated on below, when the program is run on the processor 120.

FIG. 3a shows a first graph expressing a first parameter $x_1$ as a function of time t. FIG. 3b shows a second graph expressing a second parameter $x_2$ as a function of time t. For example, the first and second parameters $x_1$ and $x_2$ may represent a ratio between an amount of gas G and an amount of liquid L in the measurement section M at the positions for the first and second sensor devices S1 and S2 respectively.

FIG. 3c shows a third graph expressing a cross correlation $R(\tau)$ between the first and second parameters $x_1$ and $x_2$ for different time offsets $\tau$. As can be seen, there is a distinct peak value in the cross correlation function $R(\tau)$ for a time offset $\Delta t = a\tau$, where a is a sampling interval t. This is equivalent to that the average travelling time for the liquid flow between the position for the first sensor device S1 and the position for the second sensor device S2 is $\Delta t$. Given that the distance $s_{S1-S2}$ between these two positions is known, the overall flow rate $v_F$ of the liquid flow can be determined as:

$$v_F = \frac{s_{S1-S2}}{\Delta t} \quad (3)$$

The cross correlation $R(\tau)$ may be calculated as:

$$R(\tau) = \sum_{t=1}^{N} x_1(t-\tau)x_2(t) \quad (4)$$

where N is a last sample of a sampling period, preferably corresponding to a measuring interval of 1 to 5 seconds in respect of the parameters $x_1$ and $x_2$.

FIG. 4 illustrates how a proposed inductive sensor element measures the speed of a flowing fluid containing gas and liquid.

Here, a first coil for electric current 410 is arranged on a first side of a conduit 110 for the fluid, and a second coil for electric current 420 is arranged on a second side of the conduit 110 opposite to the first side. An alternating voltage U(f) is applied between a pair of terminals connected to the first and second coils 410 and 420 respectively. The alternating voltage U(f) may have a frequency f at 20 kHz to 60 kHz, preferably around 40 kHz. Depending on the speed $v_F$ of the flowing fluid a voltage $\Delta u(f_F)$ is also induced in the coils 410 and 420. Thus, the deviations $\Delta u(f_F)$ from the applied voltage U(f) represents a measure of the speed of the flowing fluid.

In order to sum up, with reference to the flow diagram in FIG. 5, we will now describe the general method according to the invention for determining a liquid flow and a gas flow in a fluid medium containing a mix of gas and liquid.

In a first step 510, a first measure in respect of the fluid medium is registered via a first sensor device in a measurement section of a conduit for the fluid medium.

A second step 520 (preferably parallel to step 510) registers, via a second sensor device in the measurement section, a second measure in respect of the fluid medium. The first and second measurers are mutually independent. However, the first and second measures are both dependent on the liquid flow as well as the gas flow in the fluid medium. Subsequently, a step 530 derives the flow of the first fluid and/or the flow of the second fluid based on the first and second measures, for instance by using a lookup table or an artificial neural network.

Thereafter, the procedure loops back to steps 510 and 520 for updated registering of flow measures.

All of the process steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A device for measuring a flow within a fluid medium, the device comprising:
    a conduit (110) with a measurement section (M) that in use receives and transports a flow (FG) of a first fluid (G) and a flow (FL) of the second fluid (L) within the fluid medium flowing through the measurement section (M);
    a first sensor device (S1) arranged in the measurement section (M), wherein the first sensor device responds to at least one stimulus caused by the fluid medium by registering a first measure (m1) representing a first type of physical characteristic of the fluid medium flowing through the measurement section (M);
    a second sensor device (S2) arranged in the measurement section (M), wherein the second sensor device responds to at least one other stimulus caused by the fluid medium by registering a second measure (m2) representing a second type of physical characteristic of the fluid medium flowing through the measurement section (M), the second type physical characteristic of the fluid medium being different from the first type physical characteristic of the fluid medium, the second measure (m2) being independent from the first measure (m1), and the first and second measures (m1, m2) both being dependent on the flow (FG) of the first fluid (G) and on the flow (FL) of the second fluid (L) in the fluid medium in the measurement section (M),
    wherein the first measure (m1) and the second measure (m2) are sufficient to solve both i) a first function (F1(m1,m2)) that defines the flow (FG) of the first fluid (G) and ii) a second function (F2(m1,m2)) that defines the flow (FL) of the second fluid (L); and
    a processor (120) operatively connected to the first sensor device (S1) and to the second sensor device (S2) to receive the first and second measures (m1, m2) and derive at least one of the group consisting of i) the flow (FG) of the first fluid (G), and ii) the flow (FL) of the second fluid (L) based on the first and second measures (m1, m2).

2. The device according to claim 1, wherein,
    the processor (120) derives both i) the flow (FG) of the first fluid (G), and ii) the flow (FL) of the second fluid (L) based on the first and second measures (m1, m2).

3. The device according to claim 2, wherein, in deriving both i) the flow (FG) of the first fluid (G), and ii) the flow (FL) of the second fluid (L) based on the first and second measures (m1, m2), the processor (120) implements an artificial neural network (ANN) modeling a relationship between a set of pairs of the first and second measures (m1; m2) and/or the flow (FG) of the first fluid (G) and the flow (FL) of the second fluid (L) respectively.

4. The device according to claim 2, further comprising a data storage (130) including a look-up table containing a collection of values pairs, each value pair respectively representing a first value of the flow (FG) of the first fluid (G) and a first value of the flow (FL) of the second fluid (L) for a given combination of the first and second measures (m1, m2),
    wherein the processor (120) derives both i) the flow (FG) of the first fluid (G), and ii) the flow (FL) of the second fluid (L) based on the first and second measures (m1, m2) from the look-up table and the received first and second measures (m1, m2).

5. The device according to claim 4, wherein, in the look-up table, each value of the flow (FG) of the first fluid (G) respectively represents a gas flow and each value of the flow (FL) of the second fluid (L) represents a liquid flow.

6. The device according to claim 4, wherein first sensor device (81) comprises a conductivity sensor.

7. The device according to claim 5, wherein,
    wherein the first sensor device (S1) comprises an inductive sensor,
    the first measure (m1) represents a speed of the fluid medium,
    the inductive sensor comprises a first coil for electric current (410) arranged on a first side of a conduit (110), and a second coil for electric current (420) arranged on a second side of the conduit (110) opposite to the first side, and when an alternating voltage (U(f)) of a known applied voltage is applied between a pair of terminals connected to the first and second coils respectively, the speed of the flowing fluid is represented by deviations from the applied voltage.

8. The device according to claim 1, wherein the first measure (m1) represents a ratio of an amount of a gas (G) and an amount of a liquid (L) present in the measurement section (M), the ratio indicating a filling degree of the measurement section (M).

9. The device according to claim 1, wherein the first measure (m1) represents a speed of the fluid medium.

10. The device according to claim 9, wherein the second measure (m2) represents a ratio of an amount of a gas (G) and an amount of a liquid (L) present in the measurement section (M), the ratio indicating a filling degree of the measurement section (M).

11. The device according to claim 9, wherein the second measure (m2) represents a pressure drop over a known length of a conduit segment of the measurement section (M).

12. The device according to claim 9, wherein the second sensor device (S2) analyzes the fluid medium in the measurement section (M) during a measurement time interval, and based thereon produces the second measure (m2) to represent a flow pattern of the fluid medium during said measurement time interval.

13. The device according to claim 12, wherein the measurement time interval is in a range of 0.5 to 45 seconds.

14. The device according to claim 12, wherein the measurement time interval is in a range of 1 to 5 seconds.

15. The device according to claim 9, further comprising:
    a third sensor device (S3) arranged in the measurement section (M) and operatively connected to the processor (120), wherein the third sensor device (S3) measures an electrical conductivity of the fluid in the measurement section (M) and based thereon derives a third measure (m3) representing an estimated ratio between an amount of the first fluid (G) and an amount of the second fluid (L) in the measurement section (M),
    wherein the second measure (m2) represents a pressure drop over a known length of a conduit segment of the measurement section (M), and wherein the processor (120) derives the flow (FG) of the first fluid (G) and the flow (FL) of the second fluid (L) based on the first, second and third measures (m1, m2, m3) by using the second measure (m2) for fluid flow (F) rates above or equal to a threshold flow rate and using the third measure (m3) for fluid flow (F) rates below the threshold flow rate.

16. The device according to claim 1, wherein,
wherein the device is free of any sensors other than said first and second sensor devices, and
said processor derives the flow (FG) of the first fluid (G) and the flow (FL) of the second fluid (L) based free of any measure representing any characteristic of the fluid medium flowing through the measurement section (M) other than said first and second measures (m1, m2).

17. The device according to claim 15, wherein,
wherein the first sensor device (S1) is free of any sensors other than said first, second, and third sensor devices,
the processor (120) derives the flow (FG) of the first fluid (G) and the flow (FL) of the second fluid (L) free of any measure representing any characteristic of the fluid medium flowing through the measurement section (M) other than the first measure (m1) and the second measure (m2) for fluid flow (F) rates above or equal to a threshold flow rate, and
the processor (120) derives the flow (FG) of the first fluid (G) and the flow (FL) of the second fluid (L) free of any measure representing any characteristic of the fluid medium flowing through the measurement section (M) other than the first measure (m1) and the third measure (m3) for fluid flow (F) rates below the threshold flow rate.

18. The device according to claim 4, wherein, in the look-up table, each value of the flow (FG) of the first fluid (G) respectively represents a gas flow and each value of the flow (FL) of the second fluid (L) represents a milk flow.

19. The device according to claim 4, wherein, in the look-up table, each value of the flow (FG) of the first fluid (G) respectively represents a gas flow and each value of the flow (FL) of the second fluid (L) represents an oil flow.

20. A method of measuring a flow within a fluid medium, the method comprising:
having a device that includes a conduit (110) with a measurement section (M) receive and transport a flow (FG) of a first fluid (G) and a flow of the second fluid (L) within the fluid medium flowing through the measurement section (M);
registering a first measure (m1) representing a first type of physical characteristic of the fluid medium flowing through the measurement section (M) from a first sensor device (S1) arranged in the measurement section (M), wherein the first sensor device responds to at least one stimulus caused by the fluid medium by registering the first measure (m1);
registering a second measure (m2) representing a second type of physical characteristic of the fluid medium flowing through the measurement section (M) from a second sensor device (S2), wherein the second sensor device responds to at least one other stimulus caused by the fluid medium by registering the second measure (m2), the second type physical characteristic of the fluid medium being different from the first type physical characteristic of the fluid medium, the second measure (m2) being independent from the first measure (m1), and the first and second measures (m1, m2) both being dependent on the flow (FG) of the first fluid (G) and on the flow (FL) of the second fluid (L) in the fluid medium in the measurement section (M),
wherein the first measure (m1) and the second measure (m2) are sufficient to solve both i) a first function (F1(m1,m2)) that defines the flow (FG) of the first fluid (G) and ii) a second function (F2(m1,m2)) that defines the flow (FL) of the second fluid (L); and
using a processor (120) operatively connected to the first and second sensor devices (S1, S2), deriving at least one of the group consisting of i) the flow (FG) of the first fluid (G), and ii) the flow (FL) of the second fluid (L) based on the first and second measures (m1, m2).

21. A non-transitory computer-readable medium having a computer program recorded thereon, the computer program, when executed on a processor, causes the processor to execute a method of measuring a flow within a fluid medium, the method comprising:
the processor communicating with a device that includes a conduit (110) with a measurement section (M) receive and transport a flow (FG) of a first fluid (G) and a flow of the second fluid (L) within the fluid medium flowing through the measurement section (M);
the processor receiving a first measure (m1) representing a first type of physical characteristic of the fluid medium flowing through the measurement section (M) from a first sensor device (S1) arranged in the measurement section (M), wherein the first sensor device responds to at least one stimulus caused by the fluid medium by registering the first measure (m1);
the processor receiving a second measure (m2) representing a second type of physical characteristic of the fluid medium flowing through the measurement section (M) from a second sensor device (S2), wherein the second sensor device responds to at least one other stimulus caused by the fluid medium by registering the second measure (m2), the second type physical characteristic of the fluid medium being different from the first type physical characteristic of the fluid medium, the second measure (m2) being independent from the first measure (m1), and the first and second measures (m1, m2) both being dependent on the flow (FG) of the first fluid (G) and on the flow (FL) of the second fluid (L) in the fluid medium in the measurement section (M),
wherein the first measure (m1) and the second measure (m2) are sufficient to solve both i) a first function (F1(m1,m2)) that defines the flow (FG) of the first fluid (G) and ii) a second function (F2(m1,m2)) that defines the flow (FL) of the second fluid (L); and
the processor deriving deriving at least one of the group consisting of i) the flow (FG) of the first fluid (G), and ii) the flow (FL) of the second fluid (L) based on the first and second measures (m1, m2).

* * * * *